(12) United States Patent
Walliser et al.

(10) Patent No.: US 7,434,763 B2
(45) Date of Patent: Oct. 14, 2008

(54) ROTOR/WING DUAL MODE HUB FAIRING SYSTEM

(75) Inventors: Eric W. Walliser, Mesa, AZ (US); Robert A. Nowak, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 225 days.

(21) Appl. No.: 11/162,924

(22) Filed: Sep. 28, 2005

(65) Prior Publication Data

US 2008/0149759 A1   Jun. 26, 2008

(51) Int. Cl.
*B64C 27/22* (2006.01)
(52) U.S. Cl. .................... 244/7 R; 244/17.27
(58) Field of Classification Search ........ 244/6, 244/7 R, 7 A, 17.11, 17.27, 8, 12.4, 17.25; 416/142, 143
See application file for complete search history.

(56) References Cited

U.S. PATENT DOCUMENTS

| | | | | |
|---|---|---|---|---|
| 2,094,105 A | * | 9/1937 | Myers | 244/7 R |
| 2,703,210 A | * | 3/1955 | Myers | 244/6 |
| 3,096,041 A | * | 7/1963 | Cheeseman et al. | 244/7 R |
| 3,529,793 A | * | 9/1970 | Krongos | 244/139 |
| 3,647,315 A | * | 3/1972 | Rostad et al. | 416/31 |
| 5,454,530 A | | 10/1995 | McDonnell | |
| 6,170,779 B1 | | 1/2001 | McDonnell | |
| 6,471,158 B1 | * | 10/2002 | Davis | 244/8 |
| 6,622,962 B1 | * | 9/2003 | White | 244/7 R |
| 6,669,137 B1 | * | 12/2003 | Chen | 244/7 R |

FOREIGN PATENT DOCUMENTS

WO   2004/024558 A2   3/2004

* cited by examiner

*Primary Examiner*—Tien Dinh
(74) *Attorney, Agent, or Firm*—Ostrager Chong Flaherty & Broitman P.C.

(57) ABSTRACT

A hub fairing system (12) for a stopped-rotor aircraft (10) having a fuselage (14) including a hub (16). The hub (16) is mechanically coupled to the fuselage (14) and to multiple blades (40) and is rotated by an engine (22). A retractable fairing (60, 64) covers a portion of the hub (16). An actuator (26) is coupled to the fairing (60, 64). A controller (28) is coupled to the actuator (26) and retracts the fairing (60, 64). A method of reducing drag on the aircraft includes transitioning between a rotary-wing mode and a fixed-wing mode. The fairing (60, 64) is deployed over a portion of the hub (16) upon the completion of the transition between flight modes.

19 Claims, 3 Drawing Sheets

ROTOR/WING DUAL MODE HUB FAIRING SYSTEM

GOVERNMENT CONTRACT

This invention was made with Government support under Contract Number MDA 972-98-9-0009. The Government has certain rights in this invention.

TECHNICAL FIELD

The present invention relates generally to aeronautical vehicle drag reducing systems. More particularly, the present invention relates to a system for minimizing parasitic drag associated with the hubs of a stopped-rotor aircraft during its fixed-wing mode of flight.

BACKGROUND OF THE INVENTION

Helicopters are versatile aircraft in that they are capable of vertical lift and forward propulsion without the need for a runway, unlike most other passenger and cargo transporting style aircraft, such as propeller and jet powered aircraft. Unfortunately, helicopters are limited in forward speed.

In order to have vertical takeoff and landing capability of a helicopter and to have forward flight speed ability of other aircraft, different styles of vertical takeoff and landing (VTOL) aircraft are being introduced. One VTOL aircraft, in particular, is the canard rotor/wing (CRW) aircraft. A canard rotor/wing aircraft provides significant improvements in forward speed over traditional style helicopters. Aircraft of the canard rotor/wing design, in general, include one or more rotor/wings located on an aircraft fuselage that may be operated in a rotary-wing mode and in a fixed-wing mode. The rotor/wings include two symmetrical blades and produce lift irrespective of flow direction.

There is a current desire to increase the drag efficiency of a canard rotor/wing aircraft. Improved drag efficiency results in less fuel needed for a given mission, which in turn reduces the overall vehicle weight. Reduced vehicle weight can reduce vehicle-operating costs and allow for increased payload or cargo carrying capability of the aircraft.

As with traditional helicopters, approximately two-thirds of all drag linked with any canard/rotor wing aircraft can be traced to three features, specifically the rotor, the rotor hub, and the interactions thereof with the fuselage of the aircraft. Thus, there exists a need for an improved canard rotor/wing design with reduced drag associated with the stated features.

SUMMARY OF THE INVENTION

The present invention provides a hub fairing system for an aircraft that has a fuselage and rotor/wing. The hub fairing system includes a rotor hub that is mechanically coupled to the fuselage and to multiple blades. The hub and blades are rotated by an engine. A retractable fairing covers a portion of the hub. An actuator is coupled to the fairing. A controller is coupled to the actuator and retracts the fairing.

A method of reducing drag on an aircraft of a canard rotor/wing design is also provided. The method includes transitioning between a rotary-wing mode and a fixed-wing mode. This transitioning involves stopping the rotation of a rotor/wing while supporting the weight of the aircraft via lift from the canard and tail of the aircraft. Upon completion of the transition, a fairing is deployed over the hub portion of the rotor/wing.

The embodiments of the present invention provide several advantages. One such advantage is the provision of using one or more retractable fairings over a hub of a rotor/wing. The use of the fairings reduces drag associated with the rotor/wing, hub, and fuselage of a canard rotor/wing aircraft and thus, improves aerodynamic performance of that aircraft. The reduced drag improves fuel economy and increases cargo-carrying capabilities of the aircraft.

Another advantage provided by an embodiment of the present invention is the provision of one or more retractable hub fairings that are retractable within an outer mold line of a fuselage. When fully retracted the hub fairings do not create drag normally associated with an open door, fairing, or access panel.

Yet another advantage provided by an embodiment of the present invention is the provision of one or more fairings that, when deployed, form a continuous aerodynamic surface with a fuselage and a rotor/wing. This further reduces drag of a canard rotor/wing aircraft when in a fixed-wing mode.

The present invention improves functionality, performance, maintainability, and safety of a canard rotor/wing aircraft. In addition, the present invention is simplistic in design, reliable, and relatively inexpensive to implement and to maintain.

The present invention itself, together with further objects and attendant advantages, will be best understood by reference to the following detailed description, taken in conjunction with the accompanying drawing.

DETAILED DESCRIPTION

Figure 1:
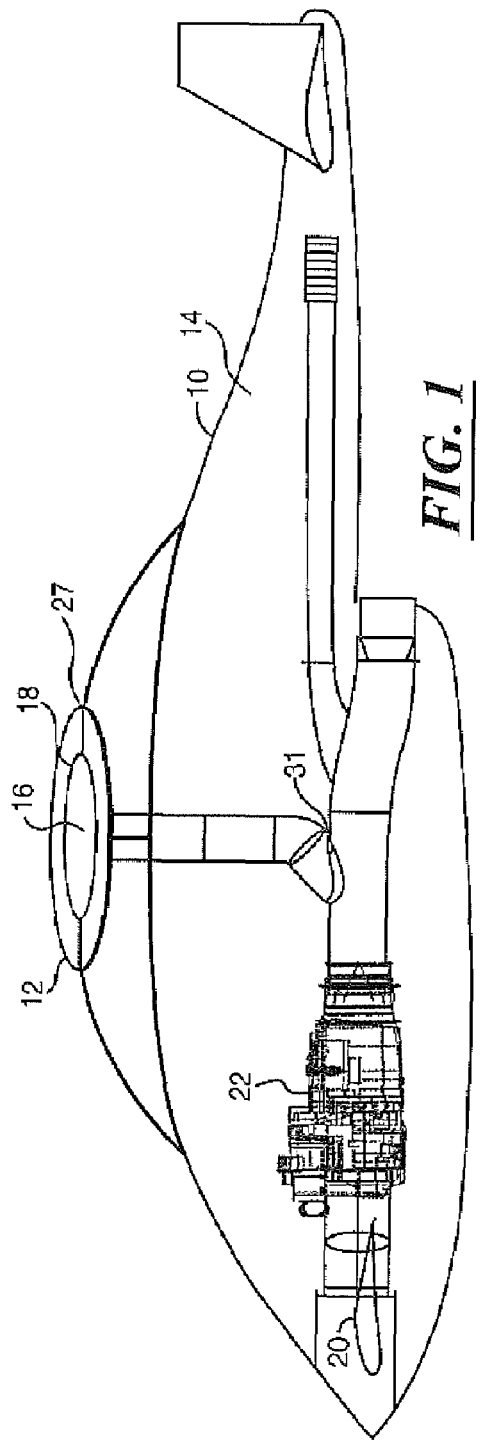
FIG. 1 is a side view of a vertical takeoff and landing (VTOL) aircraft utilizing a single rotor/wing configuration and incorporating a dual mode rotor/wing hub fairing system in a deployed state in accordance with an embodiment of the present invention.

Unlike traditional helicopters that have continuously rotating blades while in flight, a canard rotor/wing aircraft has one or more rotors that are not rotating during a significant portion of their flight. This fixed-wing mode allows for the use of a dual mode rotor/wing hub fairing system that is described in detail below.

In each of the following figures, the same reference numerals are used to refer to the same components. A variety of other embodiments are contemplated having different combinations of the below described features of the present invention, having features other than those described herein, or even lacking one or more of those features. As such, it is understood that the invention can be carried out in various other suitable modes.

In the following description, various operating parameters and components are described for one constructed embodiment. These specific parameters and components are included as examples and are not meant to be limiting.

Figure 2:
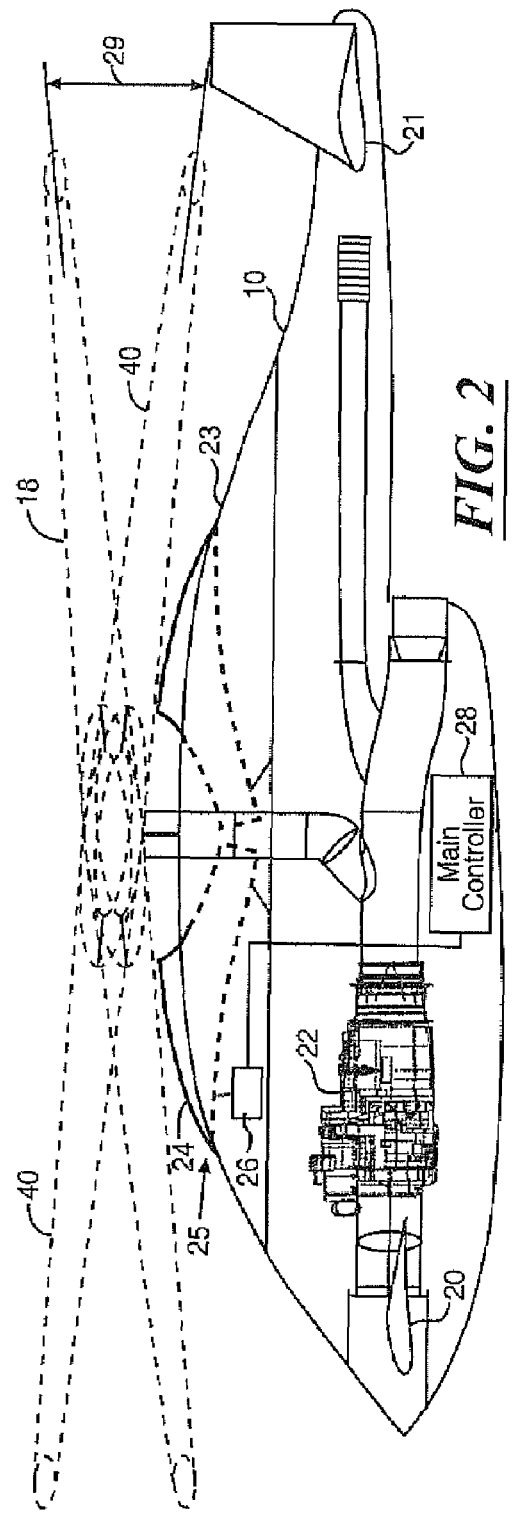
FIG. 2 is a side view of the VTOL aircraft of FIG. 1 with the dual mode rotor/wing hub fairing system in a retracted state in accordance with an embodiment of the present invention.

Referring now to FIGS. 1 and 2, side views of a vertical takeoff and landing (VTOL) aircraft 10 utilizing a canard rotor/wing configuration and incorporating a dual mode rotor/wing hub fairing system 12 in accordance with an embodiment of the present invention is shown. Although the present invention is primarily described with respect to a rotor/wing aircraft of the canard design, the present invention may be applied to other rotor/wing aircraft. For example, the present invention may be applied to a tandem rotor/wing aircraft.

Figure 5:
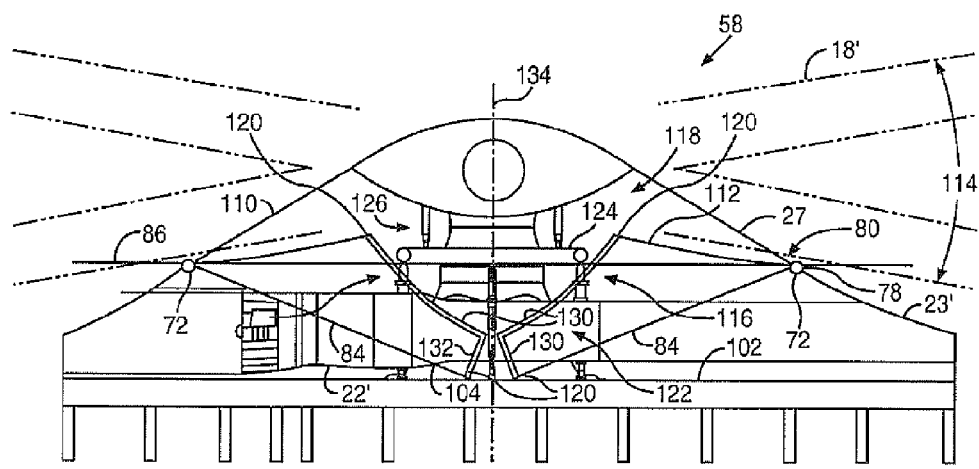
FIG. 5 is a side view of the portion of the dual mode rotor/wing hub fairing system of FIG. 3.

The fairing system 12 is shown in a deployed state in FIG. 1 and in a retracted stated in FIG. 2. The aircraft 10 includes a fuselage 14, a rotor/wing hub assembly 16 including a rotor/wing 18, a canard wing 20, and horizontal tail wings 21. The rotor/wing 18 is mechanically coupled to the fuselage 14 via the hub 16, which is rotated by one or more engines 22. The pylori 23 couples the hub 16 to the fuselage 14. The pylori 23 may or may not be used and may be referred to as an extension and part of the fuselage 14. The fairing system 12, in general, includes the fuselage 14, the hub 16, and the rotor/wing 18, as well as a hub fairing set 24 and an actuation system 25. The actuation system displaces the fairing set 24 via one or more actuators 26. During flight the fairing 24 is deployed to form a continuous aerodynamic hub surfaces with the fuselage 14, or fuselage exterior body, and the rotor/wings 18. An example of a continuous hub surface 27, as stated, is shown in FIGS. 1 and 5.

The rotor/wing 18 operates in dual modes including a rotary-wing mode and a fixed-wing mode. Thus, a rotor/wing aircraft refers to an aircraft that has a wing or a set of blades that are capable of operating in both a rotary-wing mode and a fixed wing mode. In conjunction with the engines 22, the rotor/wing 18 enables takeoff, landing, low speed flight and hover capabilities of a helicopter and forward high speed lift capabilities of a fixed-wing aircraft such as a jet transport. In rotary-wing mode, the rotor/wing 18 functions as a helicopter rotor, propelling and providing lift for the aircraft 10. In fixed wing mode the rotor/wing 18 functions as a fixed wing, as on a traditional airplane, and generates lift as a result of the aircraft's forward velocity. As the rotor/wing 18 is transitioned from the rotary-wing mode to the fixed-wing mode, the canard 20 and the tail wings 21 provide lift to the aircraft 10, thereby unloading the rotor/wing and allowing its rotation to be stopped. A main controller 28 is coupled to the rotor/wing 18 and switches between the rotary-wing mode and the fixed-wing mode. Although, the aircraft 10 is shown as having one rotor/wing 18, one canard 20, and two tail wings 21, additional rotor/wings and fixed wings may be incorporated. The dynamic envelope 29 of the rotor/wing 18 is shown.

The rotor/wing 18 includes at least two blades 40 that rotate to produce lift in rotary-wing mode and are locked in a fixed position relative to the fuselage in fixed-wing mode. To enable transition, engine power is gradually diverted from spinning the rotor to providing forward thrust. This diversion may be provided via a shaft drive (not shown), a reaction drive 31, or via some other drive system known in the art.

The rotor/wing 18, canard 20, and the tail wings 21 may have a leading or trailing edge devices, such as a flap, a slat, a flaperon, an aileron, a split aileron or other leading or trailing edge devices, known in the art, to provide control forces and moments during flight.

Although, the engines 22 are shown as being located in a forward portion 31 of the aircraft 10, they may be located elsewhere on the aircraft 10. Each rotor/wing incorporated on the aircraft 10 may share a single set of engines or a separate set of engines may each be assigned to each rotor/wing. The engines 22 may be turbofan engines or may be of some other type or style known in the art.

The controller 28 is preferably microprocessor based such as a computer having a central processing unit, memory (RAM and/or ROM), and associated input and output buses. The main controller 28 may be a portion of a central vehicle main control unit, an interactive vehicle dynamics module, a main safety controller, or be a stand-alone controller as shown.

Figure 3:
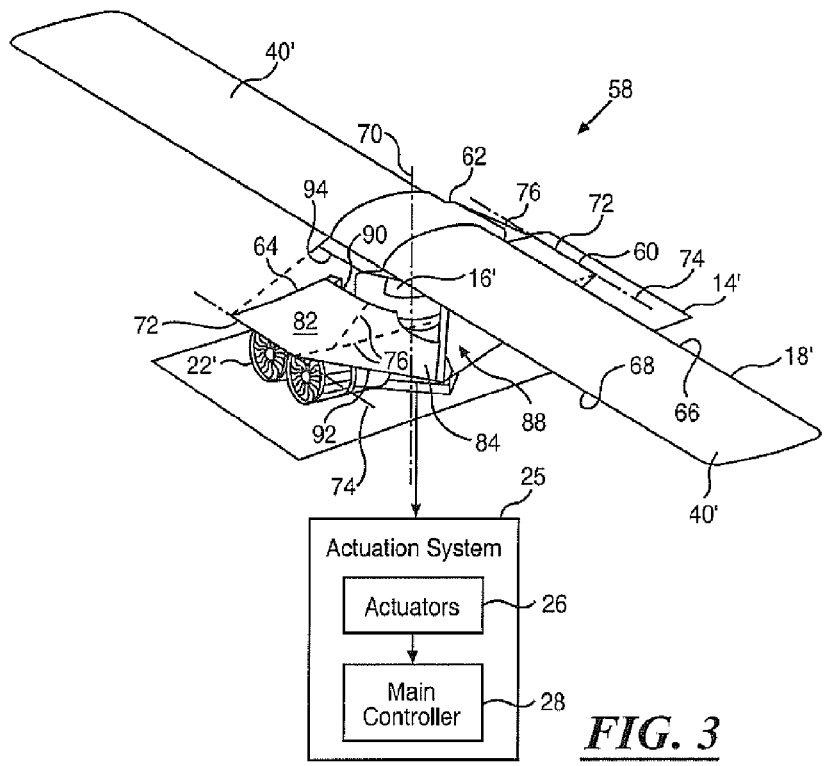
FIG. 3 is an isometric perspective and block diagrammatic view of a dual mode rotor/wing hub fairing system in accordance with an embodiment of the present invention.
Figure 4:
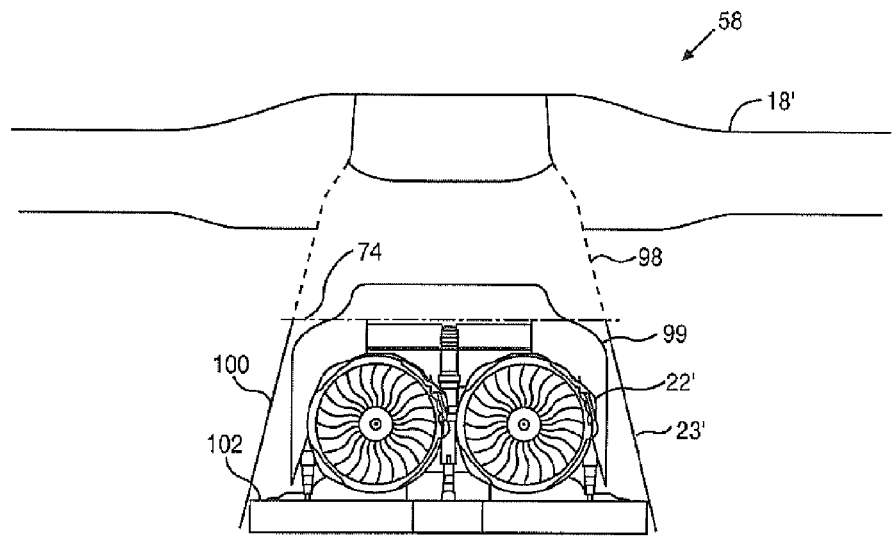
FIG. 4 is a front close-up cutaway view of the portion of the dual mode rotor/wing hub fairing system of FIG. 3.

Referring now to FIGS. 3-5, an isometric perspective and block diagrammatic view, a front close-up cutaway view, and a side view of the rotor/wing portion 58 of a canard rotor/wing aircraft are shown. The fairing system 12 includes the fairing sets 82, which each include an aft non-rotating fairing 60, a rotating fairing 62, and a forward non-rotating fairing 64. The aft non-rotating fairing 60 is located on an aft side 66 of the rotor/wing 18' and the forward non-rotating fairing 64 is located on a front side 68 of a rotor/wing 18'. The non-rotating fairings 60 and 64 are fixed to a fuselage 14', thus they do not rotate. The rotating fairing 62 is coupled directly to and over the axis of rotation 70 of the rotor/wing 18'. The rotating fairing 62 rotates with the rotor/wing 18'. When the rotor/wing 18' is in a stopped, the rotating fairing 62 does not rotate and is also fixed in position. Of course, this is one possible fairing arrangement; other arrangements and locations of fairing placements may be utilized.

The non-rotating fairings 60 and 64 pivot on hinges 72, which have associated hinge lines 74, between deployed and retracted positions. The deployed positions are represented by dashed lines 76. The hinges 72 reside on or near the edge 78 of a fuselage exterior body panel 79 nearest a hub fairing opening 80. The hinges 72 are attached away from the rotor/wing 18' on the non-rotating fairings 60 and 64. The non-rotating fairings 60 and 64 have a center portion 82 and a pair of outer flanges 84 coupled thereto. The center portion 82, when deployed, angles upward from the fuselage 14' to the rotating fairing 62 with respect to the plane 86 of the hub opening 80. The body panel edge 78, the hub fairing opening 80, and the plane 86 are best seen in FIG. 5.

The outer flanges 84 extend around an outer periphery 88 of the hub 16' away from the center portion 82. The outer flanges 84 may be integrally formed with the center portion 82 as a single unit, as shown, or may be separately attached components. The non-rotating portions 60 and 64 include an upper edge line 90 and a lower edge line 92. The upper edge line 90 follows or matches the contour of the corresponding mating areas 94 on the rotor/wing 18' and on the rotating fairing 62. The upper edge line 90, in matching the contour of the rotor/wing 18' and the rotating fairing 62, provides an inherent brace therebetween. The lower edge line 92 matches the contour of the fuselage 14' near the hub opening 80.

The rotating fairing 62 extends over and cantilevers from the rotor/wing 18' on both sides 66 and 68 in a direction perpendicular to the extension of the blades 40' of the rotor/wing 18'. In the embodiment shown, the rotating fairing 62 cantilevers beyond edges 66 and 68 in fore and aft directions relative to the rotor/wing 18' when in the fixed-wing mode. The rotating fairing 62 may be formed separate from the rotor/wing 18' and coupled thereto, as shown, or integrally formed as part of the rotor/wing 18'.

The fairings 60, 62, and 64 may be of various types, styles, sizes, and shapes, and may be formed of various materials. The fairings 60, 62, and 64 may be formed of a metal or composite commonly used in the aerospace industry, a honeycomb configured material, or other suitable material known in the art, or a combination thereof.

The non-rotating fairings 60 and 64 when deployed may be held in position via the actuation system 25 or via one or more coupling elements (not shown). The coupling elements are used to attach the upper edge line 90 to the rotor/wing 18' and/or to the rotating fairing 62. The coupling elements may include clips, magnetic locks, mechanical or electrically actuated locking mechanisms, or other coupling elements known in the art. The coupling elements may also be coupled to the controller 28 for actuated control thereof.

The fairing system 12 may also incorporate guides (not shown) or other devices known in the art for maintaining alignment of the non-rotating fairings 60 and 64.

The non-rotating fairings 60 and 64 are shown in both a deployed configuration, represented by dashed lines 98, and in a retracted configuration, represented by solid lines 99 in FIG. 4. The non-rotating fairings 60 and 64 when retracted are stowed within an outer mold line 100 of the fuselage 14'. The non-rotating fairings 60 and 64 pivot on the hinges 72 and retract within the fuselage body or pylori 23' above the fuselage structure or support frame 102. In being stowed within the outer mold line 100, the non-rotating fairings 60 and 64 do not introduce any additional drag when retracted, such as an open door, fairing, or access panel might. The non-rotating fairings 60 and 64 actually reduce drag even when retracted. This can best be seen in FIG. 5. The shape of the non-rotating fairings 60 and 64 are such that when retracted they extend around propulsion components, such as engine components and plenum and exhaust ducting and components, and other hub assembly components. This is illustrated by the non-rotating fairings 60 and 64 extending around the engines 22' and engine ductwork 104, which is also shown in FIG. 5.

The non-rotating fairings 60 and 64 are shown in both the deployed configuration, represented by outer solid lines 110 in FIG. 4, and in the retracted configuration, represented by solid lines 112. The dynamic envelope 114 of the rotor/wing 18' is shown.

When the non-rotating fairings 60 and 64 are in the deployed state, the fairings 60, 62, and 64 and the pylori 23' form the continuous flow surface 27. Air flows over the fuselage 14', over the center portions 82, and over the rotor/wing 18' across the rotating portion 62. This significantly reduces drag commonly associated with the open hub area 116.

The non-rotating fairings 60 and 64 when stowed do not fully retract below the hinge lines 74. This provides reduced drag when stowed. The center portions 82, when retracted, remain in a partially upright position as to provide some fairing coverage over the hub area 116 and to allow air passage within a narrow area 118 between the rotor/wing 18' and the upper tips 120 of the non-rotating fairings 60 and 64. Air flows over the fuselage 14', over the center portions 82, and either over the rotor/wing 18' and rotating fairing 62 or through the narrow area 118 when the non-rotating fairings 60 and 64 are in the retracted state. When retracted, the inner lower corners 120 of the non-rotating fairings 60 and 64 may rest on and/or be held in place on the fuselage structure 102.

In the retracted configuration and embodiment shown, the lower portion 122 of the hub 16' that resides at or below the swashplate 124 is shielded from outside air/turbulence by the non-rotating fairings 60 and 64. The upper portion 126 of the hub 16' that resides above the swashplate 124 and below the rotating fairing 62 is shielded in the deployed configuration, areas above, below, and at the swash plate level of the hub 16' are shielded by the non-rotating fairings 60 and 64.

Environmental seals 130 may be disposed between the edges 90 and the rotor/wing 18' and the rotating fairing 62, on the edges 94, and on the fuselage 14'. The seals 130 may also be on the separation edges 132 between the non-rotating fairings 60 and 64. The non-rotating fairings 60 and 64 separate along the parting plane 134, which extends along and through the center of the rotor/wing 18' when in the fixed-wing mode. The parting plane 134 extends vertically and laterally across the corresponding aircraft and intersects the axis of rotation 70. The seals 130 may be formed of various materials; a few examples are rubber, plastic, polyurethane, and polypropylene.

Figure 6:
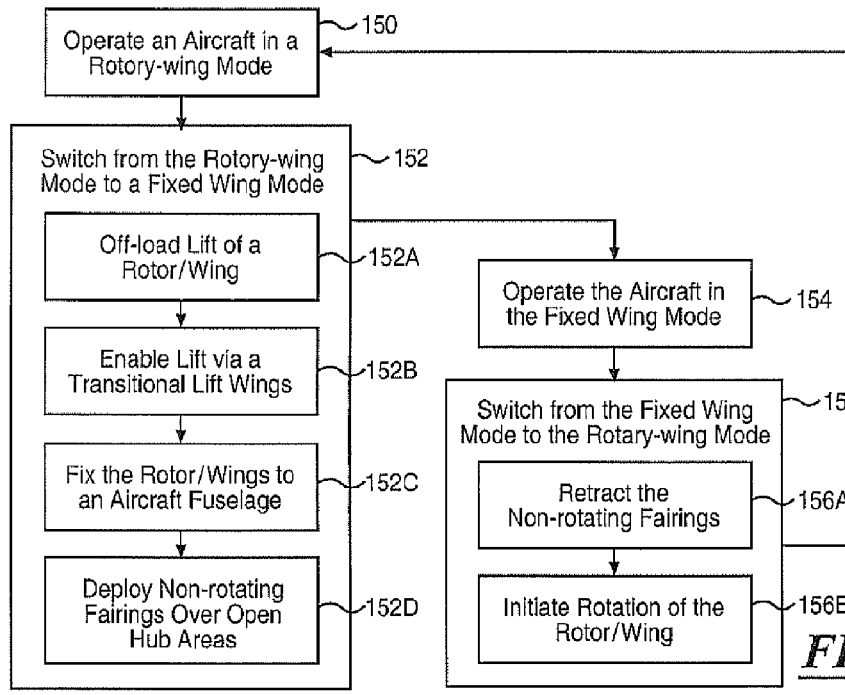
FIG. 6 is a logic flow diagram illustrating a method of reducing drag on an aircraft in accordance with an embodiment of the present invention.

Referring now to FIG. 6, a logic flow diagram illustrating a method of reducing drag on an aircraft in accordance with an embodiment of the present invention is shown.

In step 150, the aircraft 10 is operated in a rotary-wing mode to generate vertical lift on a fuselage, such as the fuselage 14 or 14'. During the rotary-wing mode, the rotor/wing, such as the rotor/wing 18 or 18', is free to rotate similar to a helicopter. The exhaust gases are allowed to flow from the engines of the aircraft through the blades of the rotor/wings and exit the rotor/wing nozzles, such as the nozzles 44 shown in FIG. 2, as to rotate the blades and thus the hubs, such as the hubs 16 or 16'. Rotation of the blades provides propelling and lifting momentum.

In step 152, a controller, such as the main controller 28, switches the aircraft from operating in the rotary-wing mode to operating in a fixed-wing mode. In step 152A, the controller begins off-loading lift of the rotor/wings, thus reducing rotational speed of the rotor/wings. Exhaust duct valves (not shown) are gradually closed to prevent exhaust gases from entering the blades and the exhaust gases are redirected to exit engine nozzles 23, to generate forward thrust. In step 152B, as the controller is off-loading lift of the rotor/wing, a canard wing and tail wings or some other transitional lift wing or combination thereof, such as the canard 20 and the tail wings 21, provide the lift to maintain flight.

In step 152C, when the rotor/wing has come to a stop, the rotor/wing is laterally positioned relative to the fuselage. The gimbaling freedom of the rotor/wings is locked and any feathering hinges are locked out such that the rotor/wing does not have flapping degrees of freedom.

In step 152D, non-rotating fairings, such as the non-rotating fairings 60 and 64, are deployed to cover a hub area between the fuselage and the rotor/wings. The non-rotating fairings are pivoted upwards, such that their upper edges mate and seal with the rotor/wings and/or rotating fairings, such as the rotating fairing 62. In step 152E, the non-rotating fairings may be locked to the rotor/wing and/or to the rotating fairing. In step 154, the aircraft is operated in the fixed-wing mode.

In step 156, the aircraft is switched from operating in the fixed-wing mode to the rotary-wing mode. In step 156A, the non-rotating fairings are released or unlocked from the rotor/wing and the rotating fairing 62 and retracted to below an outer mold line, such as the outer mold line 100 of the fuselage. In step 156B, rotation of the rotor/wing is initiated. Upon completion of step 156, the controller returns to step 150.

The above-described steps are also meant to be illustrative examples; the steps may be performed sequentially, synchronously, simultaneously, or in a different order depending upon the application.

The present invention provides a dual mode canard rotor/wing hub fairing system that reduces drag on the aircraft during both a fixed-wing mode and a rotary-wing mode. The present invention reduces drag typically associated with a rotor/wing, a hub, and a fuselage. The present invention encompasses the volume of space between the upper fuselage and the rotor/wing of a canard rotor/wing aircraft with a smooth, aerodynamic shape that may be retracted out of the way of the dynamic envelope swept out by the rotor/wing blades.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A hub fairing system for an aircraft having a fuselage and a rotor that is rotatable relative to the fuselage in a rotary-wing mode of operation and is fixed relative to the fuselage in a fixed-wing mode of operation, said hub fairing system comprising:
    a hub mechanically coupled to said rotor and rotatable relative to said fuselage and is in a vertically fixed position with respect to the fuselage;
    a first fairing disposed forward of said hub that is movable between a deployed position and a retracted position, said first fairing having an edge that is disposed near to said rotor in said deployed position and further away from said rotor in said retracted position, and said first fairing in said deployed position covering a portion of said hub disposed between said rotor and said fuselage;
    a controller for controlling the position of said first fairing; and
    a first actuator mechanically coupled to said first fairing for moving said first fairing between said deployed and retracted positions in response to command signals from said controller.

2. The system as recited in claim 1, wherein said first fairing has an external surface that forms a continuous aerodynamic surface extending from said fuselage toward said rotor in said deployed position of said first fairing.

3. The system as recited in claim 1, further comprising:
    a second fairing that is movable between a deployed position and a retracted position, said second fairing having an edge that is disposed near said rotor in said deployed position and further away from said rotor in said retracted position; and
    a second actuator mechanically coupled to said second fairing for moving said second fairing between said deployed and retracted positions in response to command signals from said controller for controlling the position of said second fairing.

4. The system as recited in claim 3, and said second fairing is disposed aft of said hub.

5. The system as recited in claim 3, further comprising a fixed fairing that is fixed to said rotor, said first, second and fixed fairings forming a drag-reducing surface when said first and second fairings are in their respective deployed positions.

6. The system as recited in claim 1, further comprising a fixed fairing that is fixed to said rotor, said first and fixed fairings forming a drag-reducing surface when said first fairing is in said deployed position.

7. The system as recited in claim 6, wherein portions of fixed second fairing extend in cantilever fashion forward and aft of said rotor respectively.

8. The system as recited in claim 6, further comprising an element for coupling said first fairing to said fixed fairing when said first fairing is in its deployed position during said fixed-wing mode of operation.

9. The system as recited in claim 1, wherein said rotor comprises a plurality of blades.

10. The system as recited in claim 1, wherein said first fairing in said retracted position is stowed within an outer mold line of said fuselage.

11. The system as recited in claim 1, further comprising a set of hinges, said first fairing pivoting on said set of hinges during movement between its deployed and retracted positions.

12. The system as recited in claim 1, further comprising an element for coupling said first fairing to said rotor when said first fairing is in its deployed position during said fixed-wing mode of operation.

13. The system as recited in claim 12, wherein said coupling element is activated in response to a command signal from said controller.

14. The system as recited in claim 1, wherein said first fairing in said retracted position extends around a propulsion component.

15. The system as recited in claim 1, wherein said first fairing in said retracted position shields a portion of said hub lying below a swashplate from outside air turbulence.

16. A hub fairing system for an aircraft having a fuselage and a rotor that is rotatable relative to the fuselage in a rotary-wing mode of operation and is fixed relative to the fuselage in a fixed-wing mode of operation, said hub fairing system comprising:
    a hub mechanically coupled to said rotor and rotatable relative to said fuselage and is in a vertically fixed position with respect to the fuselage;
    a first fairing that is movable between a deployed position and a retracted position, said first fairing disposed forward of said hub having an edge that is disposed near to said rotor in said deployed position and further away from said rotor in said retracted position, and said first fairing in said deployed position covering a forward portion of said hub disposed between said rotor and said fuselage;
    a second fairing that is movable between a deployed position and a retracted position, said second fairing having an edge that is disposed near said rotor in said deployed position and further away from said rotor in said retracted position, and said second fairing in said deployed position covering an aft portion of said hub disposed between said rotor and said fuselage;
    a controller for controlling the positions of said first and second fairings;
    a first actuator mechanically coupled to said first fairing for moving said first fairing between said deployed and retracted positions in response to first command signals from said controller; and
    a second actuator mechanically coupled to said second fairing for moving said second fairing between said deployed and retracted positions in response to second command signals from said controller,
    wherein said controller is programmed to send said first and second command signals before the aircraft can be operated said fixed-wing mode.

17. The system as recited in claim 16, further comprising a third fairing that is fixed to said rotor, said first, second and third fairings forming a drag-reducing surface when said first and second fairings are in their respective deployed positions.

18. The system as recited in claim 17, wherein said first fairing has an external surface that forms a continuous aerodynamic surface extending from said fuselage to said third fairing in said deployed position of said first fairing, and said second fairing has an external surface that forms a continuous aerodynamic surface extending from said fuselage to said third fairing in said deployed position of said second fairing.

19. The system as recited in claim 16, further comprising first and second sets of hinges, said first fairing pivoting on said first set of hinges during movement between its respective deployed and retracted positions, and said second fairing pivoting on said second set of hinges during movement between its respective deployed and retracted positions.

* * * * *